United States Patent Office 3,014,064
Patented Dec. 19, 1961

3,014,064
STABILIZATION OF ALCOHOLS AND ESTERS
Jakob K. Evenhuis and Johannes J. Zonsveld, Amsterdam, Netherlands, assignors to Shell Oil Company, a corporation of Delaware
No Drawing. Filed Aug. 19, 1958, Ser. No. 755,885
Claims priority, application Netherlands Aug. 29, 1957
2 Claims. (Cl. 260—475)

This invention relates to improvements in the preparation of esters and to the stabilization during transportation and storage of alcohols and their esters. The invention relates more particularly to the stabilization of synthetic branched-chain alcohols obtained in the Oxo process and their esters, particularly while under conditions of esterification.

It is well known that alcohols and the esters prepared therefrom, such as, for example, the synthetic alcohols produced by the Oxo synthesis and the esters prepared therefrom, will undergo discoloration during transportation, and storage. Substantial discoloration is generally found to occur during esterification of these alcohols particularly when in contact with the atmosphere. Without intent to limit in any way the scope of the invention by theory advanced herein to set forth more fully the nature of the invention, it is believed that such instability, as evidenced by color formation, of these materials is attributable at least in part to the presence therein of contaminating amounts of impurities. In the case of Oxo alcohols these impurities may comprise certain carbonyl compounds, polymers and condensation products thereof, since in the Oxo process carbonyl compounds are generally first produced from alkenes, carbon monoxide and hydrogen, which are later reduced to alcohols. Sulfur compounds originally present in the olefinic charge to the Oxo process and carried over into the alcohols produced may also contribute to discoloration of the alcohols and the esters derived therefrom. Ability to use the alcohols, and particularly their esters, in many important fields of application is dependent upon their purity and particularly upon the absence of any substantial degree of coloration. Thus, the potential value of the esters of these alcohols as plasticizers in the manufacture of a wide range of resins and plastic products is often dependent upon assurance of their stability particularly with respect to the absence of color.

It has been disclosed heretofore to incorporate certain additives in alcohols and esters. Thus, it has been proposed to add diphenylolpropane. This material, however, presents distinct disadvantages often rendering its use highly impractical. Thus the diphenylolpropane is often sufficiently effective only when added in amounts which exceed those commensurate with satisfactory composition of the alcohol or ester for many purposes. It is generally essential that a stabilizing agent be effective in as small an amount as possible, and that the effective amount is not sufficient to limit subsequent use of the alcohol and/or ester containing it.

It has now been found that alcohols and esters are stabilized, particularly with respect to color formation, by incorporating therein exceedingly small amounts of a member of the group consisting of ortho-dihydroxybenzene, para-dihydroxybenzene and alpha-naphthol.

The invention is applied broadly to the stabilization of aliphatic alcohols, and their esters. The invention is applied with particular advantage to the stabilization of the synthetic alcohols produced in the Oxo process and the esters derived therefrom. Alcohols and esters stabilized in accordance with the invention comprises the Oxo alcohols having from six to ten carbon atoms to the molecule and their esters, particularly the esters of these alcohols with a di- or polybasic carboxylic acid such as, for example, the phthalates, sebacates and adipates of these Oxo alcohols.

Quite surprisingly the ability to stabilize the alcohols and esters so effectively is peculiar to ortho- and para-dihydroxybenzene and alpha-naphthol. Thus, meta-dihydroxybenzene and beta-naphthol, as well as other phenolic compounds, have little or no stabilizing effect upon the alcohols and their esters under conditions at which the stabilizers of the present invention are extremely effective, as, for example, under the conditions prevailing during esterification.

A particular advantage of the invention resides in the small quantities of the stabilizers which need be employed to obtain a desired degree of stabilization of the alcohols and/or their esters. Thus, ortho-dihydroxybenzene, para-dihydroxybenzene and alpha-naphthol when used alone are effective in an amount ranging from as little as about 0.005 up to about 0.2% by weight of the alcohol or ester. Their use in amounts ranging from about 0.01 to about 0.1 by weight of the alcohol and/or ester is particularly preferred.

The ortho-dihydroxybenzene, para-dihydroxybenzene and alpha-naphthol may be employed individually or in combination with one another. These stabilizers are found to be far more effective when used in combination with one another. Thus a mixture of ortho- with para-dihydroxybenzene is far more effective in stabilizing the alcohols and their esters than an equivalent amount of either the ortho- or para-dihydroxybenzene alone. When employing a mixture of ortho-dihydroxybenzene with para-dihydroxybenzene as a stabilizer, such mixtures need generally not be employed in amounts exceeding about 0.02% by weight of the alcohol or ester to obtain satisfactory stabilization. In general the use of the mixture of ortho- with para-dihydroxybenzene in an amount ranging from about 0.0005 to about 0.02% by weight of the alcohol or ester is preferred.

The stabilizers may be added to the alcohols, to their esters, or to a reaction mixture in which the alcohol is undergoing esterification to the ester. The stabilizers are effective in stabilizing the alcohols and esters over prolonged periods of storage in contact with the atmosphere.

A particularly valuable use of the invention is to obviate the discoloration of alcohols and esters generally encountered at the conditions prevailing during the execution of the esterification reaction; for example, during the esterification of Oxo alcohols of six to ten carbon atoms with a di- or polybasic carboxylic acid such as phthalic acid, sebacic acid, adipic acid, and the like. Substantial discoloration is generally unavoidably encountered during esterification when the reaction mixture is in contact with the atmosphere under the esterifying conditions. Such lack of stability of the alcohol and/or ester during the esterification is overcome by the addition of ortho-dihydroxybenzene, para-dihydroxybenzene, or alpha-naphthol, or mixtures of any two thereof, or a mixture of all three thereof, to the reaction mixture or to the charge to the esterification reaction, in the stabilizing amounts defined herein above.

Incorporation of the stabilizers during esterification will be found to effect efficient stabilization of the resulting esters over prolonged periods of time under the conditions encountered in storage and/or transportation.

The stabilizers of the present invention are effective in stabilizing the alcohols and/or their esters under widely varying conditions employed in the production of the esters. Thus they are effective under non-catalytic esterification conditions; under catalytic esterification conditions using acids or anhydrides as catalysts, such as, for example, sulfonic acid or toluene sulfonic acid; and they are effective under the conditions prevailing when preparing esters by conventional ester-exchange reaction, etc.

The efficiency with which alcohols and esters are stabilized in accordance with the invention is illustrated by the following example:

EXAMPLE

One part by weight of a mixture of Oxo alcohols having seven to nine carbon atoms to the molecules was admixed with one-half part by weight of phthalic anhydride. The resulting admixture was dissolved in two parts by weight of toluene, the mixture being heated to 75° C. Concentrated sulfuric acid was added to the solution in an amount equal to 0.5% by weight of the phthalic acid present therein. The mixture was subjected to refluxing while passing a stream of air therethrough at the rate of 0.5 liters of air per liter of reaction mixture per hour. At spaced intervals the free acid and acid anhydride content of the reaction mixture was determined. When, as shown by this determination, that 99% of the anhydride had been esterified, which was the case after about three hours of refluxing, the reaction mixture was allowed to cool to room temperature. The color of the resulting reaction mixture was then determined by Lovibond tintometer. The operation was repeated in a plurality of operations carried out under substantially identical conditions but with the exception that an additive was added to the reaction mixture before refluxing was begun. The specific additive and amount thereof used in each of the plurality of operations is set forth in the following table. Also included in the following table is the value of the color determination obtained for each of the reaction mixtures produced in each of the plurality of operations.

Table

| Additive Used | Quantity of Additive Used in Percent by Weight Based on Alcohol | Color of the Resulting Esterification Reaction Mixture |
|---|---|---|
| Nil | — | 25 |
| Para-dihydroxybenzene | 0.10 | 6.3 |
| Do | 0.05 | 3.2 |
| Do | 0.025 | 2.9 |
| Do | 0.010 | 8.6 |
| Do | 0.001 | 15 |
| Ortho-dihydroxybenzene | 0.02 | 4.6 |
| Do | 0.01 | 9.6 |
| Para-dihydroxybenzene / Ortho-dihydroxybenzene } Together | 0.03 / 0.03 | 4.4 |
| Para-dihydroxybenzene / Ortho-dihydroxybenzene } Together | 0.0015 / 0.0015 | 3.4 |
| Para-dihydroxybenzene / Ortho-dihydroxybenzene } Together | 0.0010 / 0.0010 | 7.4 |
| Meta-dihydroxybenzene | 0.01 | 24 |
| Alpha-naphthol | 0.02 | 5.6 |
| Do | 0.01 | 5.4 |
| Do | 0.005 | 13.6 |
| Do | 0.001 | 22 |
| Beta-naphthol | 0.02 | 24 |
| Diphenylolpropane | 0.01 | 24 |

The invention claimed is:

1. In a process for the preparation of phthalic acid esters of oxo alcohols by esterification of an oxo alcohol with phthalic anhydride, the improvement which comprises carrying out said esterification in the presence of from about 0.01 to about 0.02% by weight of an additive selected from the group consisting of ortho-dihydroxybenzene, para-dihydroxybenzene, and alpha-naphthol, by means of which improvement said phthalic acid esters of oxo alcohols are rendered free from discoloration.

2. In a process for the preparation of phthalic acid esters of oxo alcohols by esterification of an oxo alcohol with phthalic anhydride, the improvement which comprises carrying out said esterification in the presence of from about 0.0005 to about 0.03% by weight of a substantially equimolar mixture of ortho-dihydroxybenzene and para-dihydroxybenzene, by means of which improvement said phthalic acid esters of oxo alcohols are rendered free from discoloration.

References Cited in the file of this patent

UNITED STATES PATENTS

| | | |
|---|---|---|
| 2,593,428 | Fischer et al. | Apr. 22, 1952 |
| 2,638,479 | Ballard et al. | May 12, 1953 |
| 2,752,386 | Ackroyd et al. | June 26, 1956 |
| 2,894,979 | Leach | July 14, 1959 |